（12） United States Patent
Maeda

(10) Patent No.: US 10,919,153 B2
(45) Date of Patent: Feb. 16, 2021

(54) TEACHING METHOD FOR TEACHING OPERATIONS TO A PLURALITY OF ROBOTS AND TEACHING SYSTEM USED THEREFOR

(71) Applicant: CANON KABUSHIKI KAISHA, Tokyo (JP)

(72) Inventor: Yasuharu Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 15/900,408

(22) Filed: Feb. 20, 2018

(65) Prior Publication Data

US 2018/0250818 A1   Sep. 6, 2018

(30) Foreign Application Priority Data

Mar. 6, 2017   (JP) .................................. 2017-041508
Feb. 1, 2018   (JP) .................................. 2018-016810

(51) Int. Cl.
*B25J 9/16*   (2006.01)
*B25J 9/00*   (2006.01)

(52) U.S. Cl.
CPC ........... *B25J 9/1666* (2013.01); *B25J 9/0084* (2013.01); *B25J 9/1682* (2013.01);
(Continued)

(58) Field of Classification Search
CPC ...... B25J 9/1666; B25J 9/0084; B25J 9/1682; B25J 9/1607; B25J 9/1664; B25J 9/1697;
(Continued)

(56) References Cited

U.S. PATENT DOCUMENTS 7,937,186 B2 * 5/2011 Nagatsuka ............. B25J 9/1682
318/568.13
2006/0058921 A1 * 3/2006 Okamoto ............. G05D 1/0214
700/255
(Continued)

FOREIGN PATENT DOCUMENTS

JP   H02-004792 U   1/1990
JP   H02-145276     6/1990
(Continued)

OTHER PUBLICATIONS

Kawasaki et al., Virtual teaching based on hand manipulability for multi-fingered robots, 2001, IEEE, p. 1388-1398 (Year: 2001).*
(Continued)

*Primary Examiner* — McDieunel Marc
(74) *Attorney, Agent, or Firm* — Venable LLP

(57) ABSTRACT

A teaching system, includes a computer configured to calculate trajectories of a plurality of robots disposed so as to have a common working area on a virtual space and a display unit. The computer calculates a robot passing area which is a set of trajectories drawn by a point constituting each robot when a driving unit of each robot is operated based on a teaching value on the virtual space for each robot. The computer detects whether the robot passing areas of the robots cross with each other. The computer sets a constraint condition by which none of the plurality of robots is permitted to pass through at least to a partial space within a crossing area in a case where the computer detects that the robot passing areas cross with each other.

15 Claims, 13 Drawing Sheets

(52) U.S. Cl.
CPC ... *G05B 2219/39135* (2013.01); *Y10S 901/03* (2013.01); *Y10S 901/49* (2013.01)

(58) Field of Classification Search
CPC ........ B25J 9/0081; B25J 9/163; B25J 9/1676; B25J 18/04; B25J 9/0087; B25J 9/1674; B25J 11/0095; B25J 18/00; G05B 2219/39135; G05B 2219/40116; G05B 2219/40202; G05B 2219/40476; Y10S 901/03; Y10S 901/49; Y10S 901/01; Y10S 700/90; Y10S 901/28; Y10S 901/02; Y10S 901/47; Y10S 901/46; Y10S 414/116; Y10S 901/41; G05D 1/0214; G05D 1/0221; G05D 1/0246; A47L 11/302; A01D 34/008; B60R 19/483; F04D 29/4233; G01S 5/0284; G06F 17/00; G06N 20/00; G06N 20/10; G06N 3/008; G06N 3/08; G06N 7/00; Y02T 10/645; B65G 47/904; B65G 47/905; H01L 21/67766; H01L 21/67778; H01L 21/68707

See application file for complete search history.

(56) References Cited

U.S. PATENT DOCUMENTS

| | | | | |
|---|---|---|---|---|
| 2016/0059413 | A1* | 3/2016 | Ogata | B25J 9/1676 700/186 |
| 2017/0296277 | A1* | 10/2017 | Hourtash | B25J 9/1607 |
| 2018/0099408 | A1* | 4/2018 | Shibata | B25J 9/1697 |
| 2019/0135556 | A1* | 5/2019 | Inomata | H01L 21/67766 |
| 2019/0240833 | A1* | 8/2019 | Kimura | B25J 9/1666 |

FOREIGN PATENT DOCUMENTS

| | | |
|---|---|---|
| JP | H05-150824 | 6/1993 |
| JP | H10-260714 | 9/1998 |
| JP | 2003-103491 | 4/2003 |
| JP | 2007-164417 | 6/2007 |
| JP | 2009-233757 | 10/2009 |
| JP | 2015-098076 | 5/2015 |
| JP | 2015-160253 | 9/2015 |

OTHER PUBLICATIONS

Ogata et al., Robotic assembly operation teaching in a virtual environment, 1994, IEEE, p. 391-399 (Year: 1994).*
Pomares et al., Learning environment for teaching robotics and sensorial system: application to the robots guidance, 2005, IEEE, p. 301-306 (Year: 2005).*
Kawasaki et al., Teaching for multi-fingered robots based on motion intention in virtual reality, 2000, IEEE, p. 428-433 (Year: 2000).*
Park et al., Design and Analysis of Direct Teaching Robot for Human-Robot Cooperation, 2009, IEEE, p. 220-224 (Year: 2009).*
Mlynek et al., Mathematical model of composite manufacture and calculation of robot trajectory, 2014, IEEE, pg. (Year: 2014).*
Tang et al., Vision Based Navigation for Mobile Robots in Indoor Environment by Teaching and Playing-back Scheme, 2001, IEEE, p. 3072-3077 (Year: 2001).*
Malheiros et al., Robust and Real-time Teaching of Industrial Robots for Mass Customisation Manufacturing Using Stereoscopic Vision, 2009, IEEE, p. 2336-2341 (Year: 2009).*
Afaghani et al., Advanced-collision-map-based on-line collision and deadlock avoidance between two robot manipulators with PTP commands, 2014, IEEE, pp. 1244-1251 (Year: 2014).*
Spirin et al., Rendezvous through obstacles in multi-agent exploration, 2014, IEEE, pp. 1-6 (Year: 2014).*
Sánchez, "On Delaying Collision Checking in PRM Planning—Application to Multi-Robot Coordination", International Journal of Robotics Research, vol. 21(1), pp. 5-26 (2002).
JP Office Action dated Feb. 5, 2019 in counterpart JP Application No. 2018-016810 with English translation.

* cited by examiner

TEACHING METHOD FOR TEACHING OPERATIONS TO A PLURALITY OF ROBOTS AND TEACHING SYSTEM USED THEREFOR

BACKGROUND OF THE INVENTION

Field of the Invention

The present invention relates to a teaching method for teaching operations to a plurality of robots such that the robots do not collide with each other while avoiding obstacles and to a teaching system used for the teaching method. In particular, the invention relates to a method and a system for generating and teaching operation paths by which the robots do not interfere with each other in a case the plurality of robots work simultaneously within a common working area.

Description of the Related Art

Works such as assembling, conveyance and coating in a production line of a factory are often automated by using industrial robots. A plurality of robots are often disposed closely with each other is operated simultaneously within a common area to improve productivity and to save space. In such a case, an operator used to think about and to teach, through trial and error, paths through which the robots pass and timing by which the robots are operated such that the robots do not interfere with each other.

However, this method has a problem that the more numbers of robots and operations increase, the more it becomes difficult to find a non-interfering trajectory and it takes much labor and time for teaching operations. In addition to that, if a facility within the production line or the disposition of the robots is changed, the teaching operation has to be carried out again each time by taking a much labor and time.

Then, not searching paths along which the robots do not interference with each other in a real space through trial and error, a technology of automatically generating such paths in a virtual space is being studied. For instance, there have been known such path planning algorisms as RRT (Rapidly-exploring Random Tree) and PRM (Probabilistic Road map Method). It is possible to reduce a burden of the operator during the teaching operation because just a starting point and an ending point of the robot need to be designated by using such technology. Still further, even if the facilities within the production line and the disposition of the robots are changed, they are calculated in the virtual space, so that paths that cause no interference can be calculated again with less time without occupying the production line.

While these technologies are what generate paths that causes no interference with an obstacle, a method for causing no interference even in a case of using a plurality of robots is also proposed.

For instance, Japanese Patent Application Laid-open No. 2007-164417 discloses a technology of avoiding interference among robots by providing an interlock. What is described in Japanese Patent Application Laid-open No. 2007-164417 is an interlock automatic setting system for automatically setting the interlock among the plurality of robots by editing respective operation programs of the plurality of robots in a system including the plurality of robots. The system judges whether there is an overlapped part among the plurality of robots concerning areas swept by the robots being operated. If there is an overlapped part, the system provides the interlock at their entrance to coordinate timing by which each robot passes through the interlock such that the robots do not interfere with each other in passing through the overlapped part.

A technology of causing no interference among a plurality of robots by coordinating robot operating speeds is disclosed in G. Sanchez and J.-C. Latombe, "On delaying collision checking in PRM planning: Application to multi-robot coordination" International Journal of Robotics Research, virtual obstacle 1. 21, no. 1, pp. 5-26, 2002. In a trajectory generating method described in this document, a path from a starting point to an ending point of each robot is calculate by assuming that there is no other robot, and then a graph is created by setting a position of each robot on the path as a parameter. Then, a combination of positions on the path of each robot where there is no interference is sought on the created graph, the path found first is coupled with the combination of the position on the path of each robot, and each robot is operated while coordinating the operating speed to obtain a trajectory on which the robots do not interfere with each other.

However, it is problematic firstly that the operator is required to have high skill and that it takes much works and time in the teaching operation in a case where the operator is required to verify areas through which the plurality of robots passes in a real space and to manually teach them.

In the methods disclosed in Japanese Patent Application Laid-open No. 2007-164417 and in the document described above, the trajectory of each robot is found in advance, an interference of the robots during operation is verified after that, and the operation timing and speed are coordinated to prevent an interference in a case where the interference may occur. However, because the trajectory prepared without considering an area through which another robot passes is used, there is a possibility that a solution for avoiding the interference cannot be found just by coordinating the timing and speed. Still further, even if the solution is found, a time required for the robots to complete full operations tends to be prolonged in terms of a whole system because the operating speed of each robot is slowed down or the operation of each robot is suspended to avoid the interference.

SUMMARY OF THE INVENTION

According to a first aspect of the present invention, a teaching method for teaching an operation to a plurality of robots disposed so as to have a common working area through a computer, includes storing an operation command list including positional information of a starting point and an ending point of a reference part of each robot about the operation to be taught in the computer, storing information on a position and a shape of an obstacle located within an operation range of the plurality of robots by the computer; generating a via-point for moving the reference part from the starting point to the ending point while avoiding the obstacle based on the operation command list and information on the position and the shape of the obstacle independently for each robot by the computer, storing generating via-points as a teaching value by the computer, calculating a robot passing area which is a set of trajectories drawn by a point constituting each robot when a driving unit of each robot is operated based on the teaching value on a virtual space for each robot by the computer, storing calculated robot passing areas by the computer, detecting whether the robot passing areas of the respective robots cross with each other by the computer, setting a constraint condition by which none of the plurality of robots can pass through at least to a partial space within a crossing area in a case where the crossing area is detected by the computer, adding the constraint condition in the operation command list or in positional information of the obstacle by the computer, and regenerating a teaching value for moving the reference part from the starting point to the ending point while avoiding the obstacle based on the operation command list and on the positional information of the obstacle after adding the constraint condition for each robot by the computer.

According to a second aspect of the present invention, a teaching system, includes a computer configured to calculate trajectories of a plurality of robots disposed so as to have a common working area on a virtual space and a display unit. The computer calculates a robot passing area which is a set of trajectories drawn by a point constituting each robot when a driving unit of each robot is operated based on a teaching value on the virtual space for each robot, detects whether the robot passing areas of the robots cross with each other, sets a constraint condition by which none of the plurality of robots is permitted to pass through at least to a partial space within a crossing area in a case where the computer detects that the robot passing areas cross with each other, and displays the robot passing areas and the constraint condition in the display unit.

Further features of the present invention will become apparent from the following description of exemplary embodiments with reference to the attached drawings.

DESCRIPTION OF THE EMBODIMENTS

Figure 1:
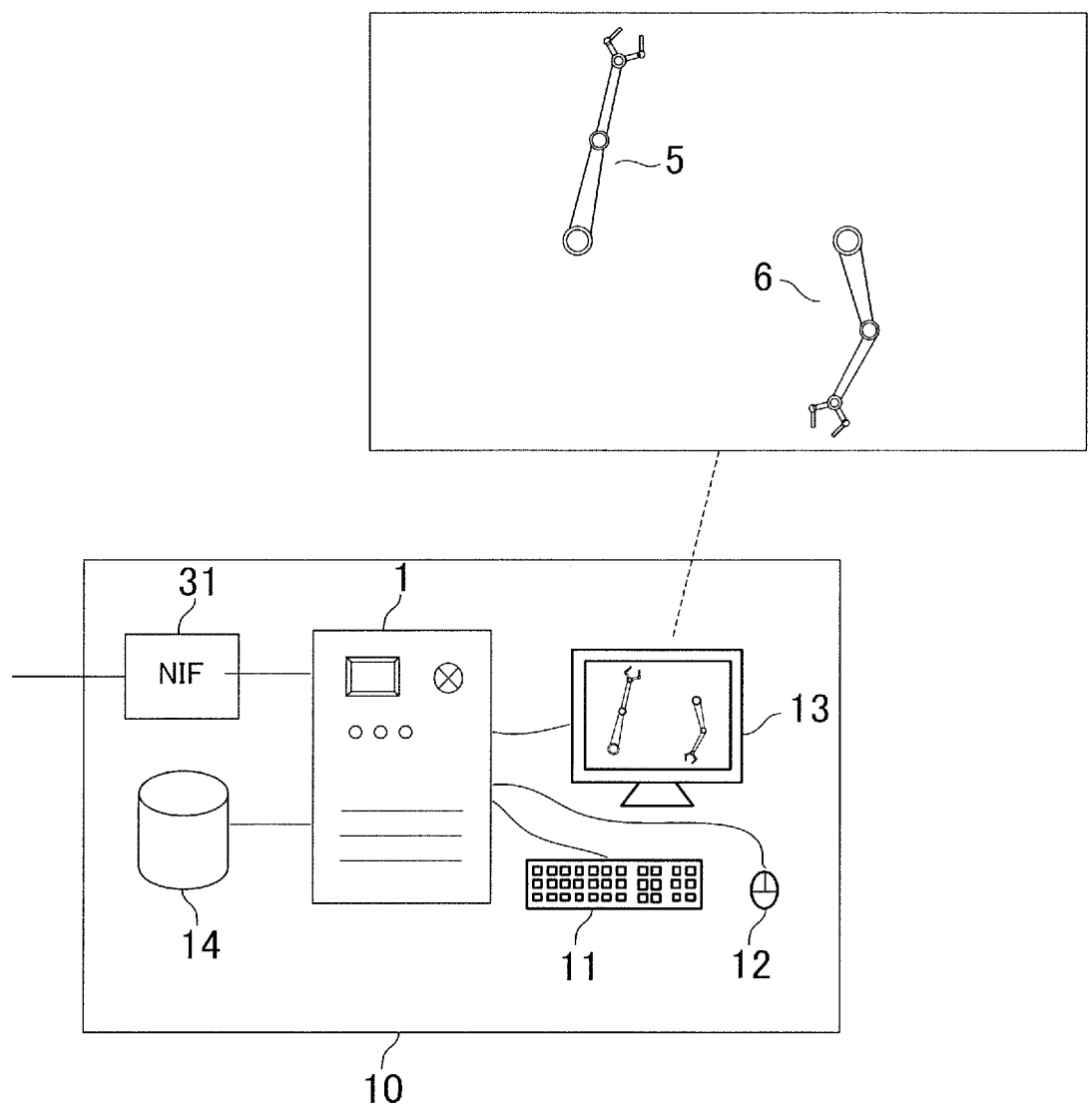
FIG. 1 illustrates a configuration of a system for embodying a teaching method of the present disclosure.

A teaching method of the present disclosure for teaching an operation of each robot through a computer in a system in which a plurality of robots is disposed so as to have a common working area will be described below. For convenience of the description, meanings of terms used in the description will be described below advance.

Reference Part

A reference part refers to a part whose position needs to be defined in advance in teaching a target operation to each robot. It is a hand part of each robot for example.

Operation Command List

An operation command list is a list including positional information of a starting point, a via-point, and an end point on which the reference part of each robot should take in a series of operations to be taught.

Path

A locus through which the reference part passes in moving the reference part from the starting point to the ending point of the operation command list while avoiding an obstacle.

Teaching Value

A teaching value is a set of teaching points such as the starting point, the via-point and the ending point for avoiding the obstacle.

Driving Unit

A driving unit refers to a mechanism driven in accordance to a drive indicating value in operating the robot, and is a rotatable joint mechanism or an extensible arm mechanism driven by a motor for example.

Robot Passing Area

A robot passing area is a set of trajectories on the virtual space through which each point constituting the robot passes when the driving unit of the robot is driven based on the teaching value. That is, the robot passing area is what a swept space (a set of three-dimensional loci) through which the robot, i.e., a tangible object, is operated in accordance to the teaching value is expressed on the virtual space.

Constraint Condition

A constraint condition is a condition set by the computer such that none of the robots can pass through at least a partial space within an area where passing areas of the plurality of robots crosses, i.e., spatially overlap, with each other.

Embodiments of teaching methods of the present disclosure will be specifically described below.

Firstly, the computer serving as the teaching system stores an operation command list including positional information of a starting point, a via-point, and an ending point to be taken by the reference part of each robot in a series of operations to be taught. Here, the reference part refers to a part whose position needs to be defined in advance in teaching a target operation to each robot. It is typically a hand part of each robot.

The computer, i.e., the teaching system, also stores information on a position and a shape of an obstacle located within an operation range of each robot.

Based on the operation command list and the information on the position and the shape of the obstacle stored in the computer, the computer generates a via-point, i.e., a teaching value, for moving the reference part of each robot from the starting point to the ending point while avoiding the obstacle independently for each robot. Here, 'generates independently' means to generate the teaching value without considering any interference with a path of another robot.

Together with the path, the computer generates a drive command value to be given to the driving unit based on the teaching value to move the reference part along the path independently for each robot. Here, the driving unit refers to a mechanism driven in operating the robot such as a rotatable joint mechanism rotated by a motor in accordance to the drive commanding value and an extensible arm mechanism extending in accordance to the drive commanding value.

Next, the computer calculates and stores a robot passing area which is a set of trajectories on the virtual space through which each point constituting the robot passes when the driving unit of the robot is driven on the virtual space based on the teaching value for each robot. That is, the robot passing area is a swept space (a set of three-dimensional loci) through which the robot, i.e., a tangible object, is virtually operated in accordance to the teaching value. The point constituting the robot always moves within the robot passing area.

Next, the computer uses the stored data of the robot passing area of each robot to find whether the robot passing area does not cross (spatially overlap) with another robot passing area by calculation.

In a case where the computer finds that the robot passing area crosses with no other robot passing area, the computer adopts the teaching value as it is.

Meanwhile, in a case where the computer detects that the robot passing area crosses with another robot passing area, the computer sets a constraint condition by which no robot can path through at least to a part within the area where the robot passing areas cross with each other and adds the constraint condition in the operation command list or in obstacle information.

According to one mode of the present disclosure, the addition of the constraint condition is performed such that the computer sets a virtual obstacle within the area where the robot passing areas cross with each other and such that the computer additionally stores information on a position and a shape of the virtual obstacle.

According to another mode of the present disclosure, the constraint condition is set such that a point, on a line segment connecting an intermediate point of a line segment connecting two points where the robot passing areas cross with each other and an origin of each robot, is set as a via-point through which the reference part of each robot has to pass on a way from the starting point to the ending point. The addition of the constraint condition is performed by adding and storing the via-point thus set in the operation command list by the computer.

In a case where the constraint condition is added, the computer regenerates the teaching value for moving the reference part from the starting point to the ending point while avoiding the obstacle based on the operation command list into which the constraint condition has been added and on the information of the position and the shape of the obstacle for each robot.

According to the teaching method of the present disclosure, it is not necessary to coordinate the operation timing of each robot to avoid the interference of the robots.

It is noted that the regenerated teaching values can be adopted as they are in a simple system in which two robots perform planar operations. However, in a case where many robots are operated or a system includes three-dimensional complicated operations, it is preferable to calculate the robot passing areas again based on the regenerated teaching values to confirm whether the robot passing areas do not cross with each other. In a case where it is confirmed anew that the robot passing areas cross with each other by the regenerated teaching value, the computer further adds a constraint condition by which no robot can pass through at least to a part within an area where the robot passing areas cross with each other anew. Then, the computer regenerates a teaching value based on the operation command list to which the constraint condition has been added and on the information of the position and the shape of the obstacle.

It is thus possible to automatically generate the teaching value by which the plurality of robot do not interfere with each other by repeatedly confirming whether the robot passing areas cross with each other and regenerating the teaching value.

Embodiments

The teaching method and the teaching system for teaching a robot of embodiments of the present disclosure will be described below with reference to the drawings. It is noted that the robot to be taught by the teaching method may be any robot as long as it is operated and is controlled by a driving source such as a motor. For instance, the robot may have a multi-joint mechanism or may move on a plane.

First Embodiment

A case of teaching two serial-link type robot arms each including a rotational joint will be described in the present embodiment.

Configuration of Teaching System

Figure 2:
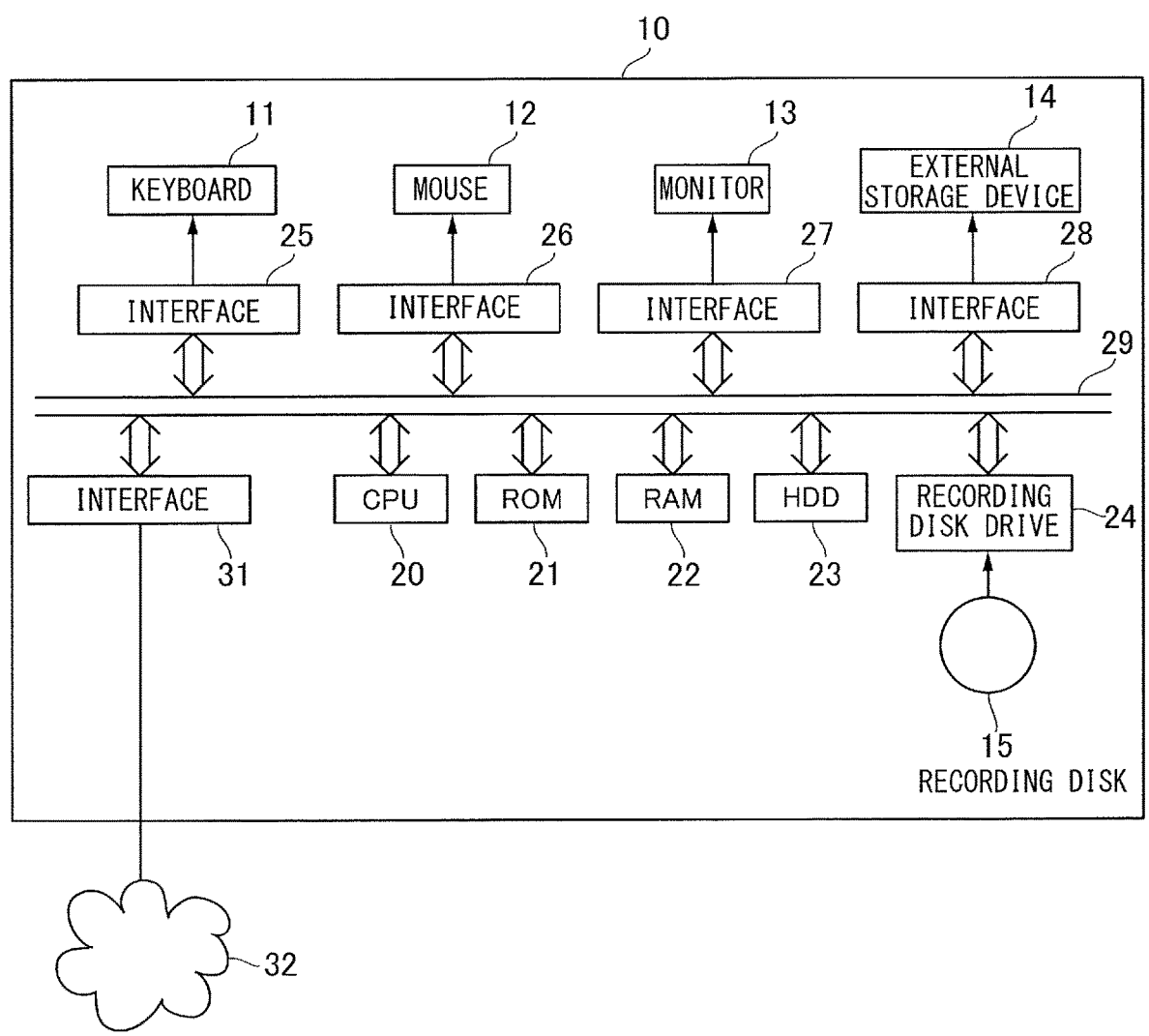
FIG. 2 is a block diagram of a computer.

FIGS. 1 and 2 illustrate a configuration of the robot teaching system of a first embodiment of the present disclosure. FIG. 1 illustrates an overall configuration of the robot teaching system and FIG. 2 is a block diagram of a computer that performs the teaching method.

In FIG. 1, an arithmetic processing portion 1 which is a part of the computer 10 is configured to generate teaching values for controlling operations of a plurality of robots disposed so as to have a common working area. In the present embodiment, the computer 10 generates teaching values that make it possible to operate two robot arms without interfering with each other while avoiding an obstacle as described later. A program to that end is stored in a storage medium and can be read when the computer executes the program.

Here, the obstacle refers to an object, other than the robot arms, disposed within an operation range of the robot arms. For instance, it may be all kind of objects disposed within the working area of a real space such as a part supplying unit, a ventilation duct and a housing of the robot system. An obstacle having a position and a shape corresponding to those of the obstacle in the real space is disposed within a virtual space used by the computer 10 in order to simulate the operation of the robot arms. Data of the obstacle disposed within the virtual space may be generated by the arithmetic processing portion 1 or may be introduced to the computer 10 from an external unit 32 through a network interface 31.

The arithmetic processing portion 1 is connected with a keyboard 11 or a mouse 12 (or a pointing device such as a track pad) serving as an input portion for inputting an operation command, data or the like. An operator inputs the operation command of the robot arm by using the keyboard 11, the mouse 12 or the like. In the present embodiment, the operator inputs data of three-dimensional coordinates of a starting point, a via-point and an ending point of the hand part at a distal end portion of the robot arm as the operation command for a work operation to be taught and stores the data or the like in the computer 10.

The arithmetic processing portion 1 is connected also with a display 13 serving as a display unit for confirming the operation command inputted by the operator, the robot passing area generated by the arithmetic processing portion 1 based on the operation command, a constraint condition or the virtual obstacle.

The arithmetic processing portion 1 can be connected with an external storage device 14, a network interface 31 and others. The external storage device 14 in FIG. 1 is mainly composed of a disk unit such as an external HDD and SSD or various optical disk units. The network interface 31 is used to transfer operation command data and others to the robot arm of an actual machine.

The external storage device 14 and the interface can be utilized as installing/updating portion for installing a trajectory generating program to the arithmetic processing portion 1 or updating the installed program. In this case, the external storage device 14 for example can be composed of an optical disk unit in which media can be exchanged. A control program for carrying out the present disclosure can be installed in the arithmetic processing portion 1 through the abovementioned optical disk and can be updated. Similarly to that, the control program for carrying out the present disclosure can be installed in the arithmetic processing portion 1 or can be updated by utilizing a predetermined network protocol through the network interface 31.

It is noted that the teaching system illustrated in FIG. 1 may be connected with the robot arm of the actual machine to be taught or is configured to generate the teaching value in an offline environment not connected with the robot arm. In generating the teaching value in the offline environment, the robot arm to be programmed is virtually three-dimensionally displayed on the display 13. Such 3D virtual display GUI (Graphical User Interface) can be configured to be able to control an arm or a joint thereof virtually displayed on the display 13 by using the keyboard 11, the mouse 12 and others.

FIG. 2 is a block diagram illustrating one exemplary configuration of the computer 10. As illustrated in FIG. 2, the computer 10 is configured by connecting the respective parts such as a CPU 20, a ROM 21, a RAM 22 and a HDD 23 (e.g., those built in the housing of the arithmetic processing portion 1) on a system bus 29.

The external storage device 14 is connected with the system bus 29 through an interface 28. While the optical disk unit has been illustrated as a member composing the external storage device 14 in particular, such disk unit is illustrated as a recording disk drive 24 in FIG. 2. The recording disk drive 24 is configured to be able to read data of the recording disk 15 organized by formats of various optical disks and to be able to write data to the recording disk 15. Accordingly, the recording disk 15 can be used to input/output the control program for carrying out the present disclosure for example. In such a case, the recording disk 15 composes a computer-readable recording medium of the control program.

Figure 3:
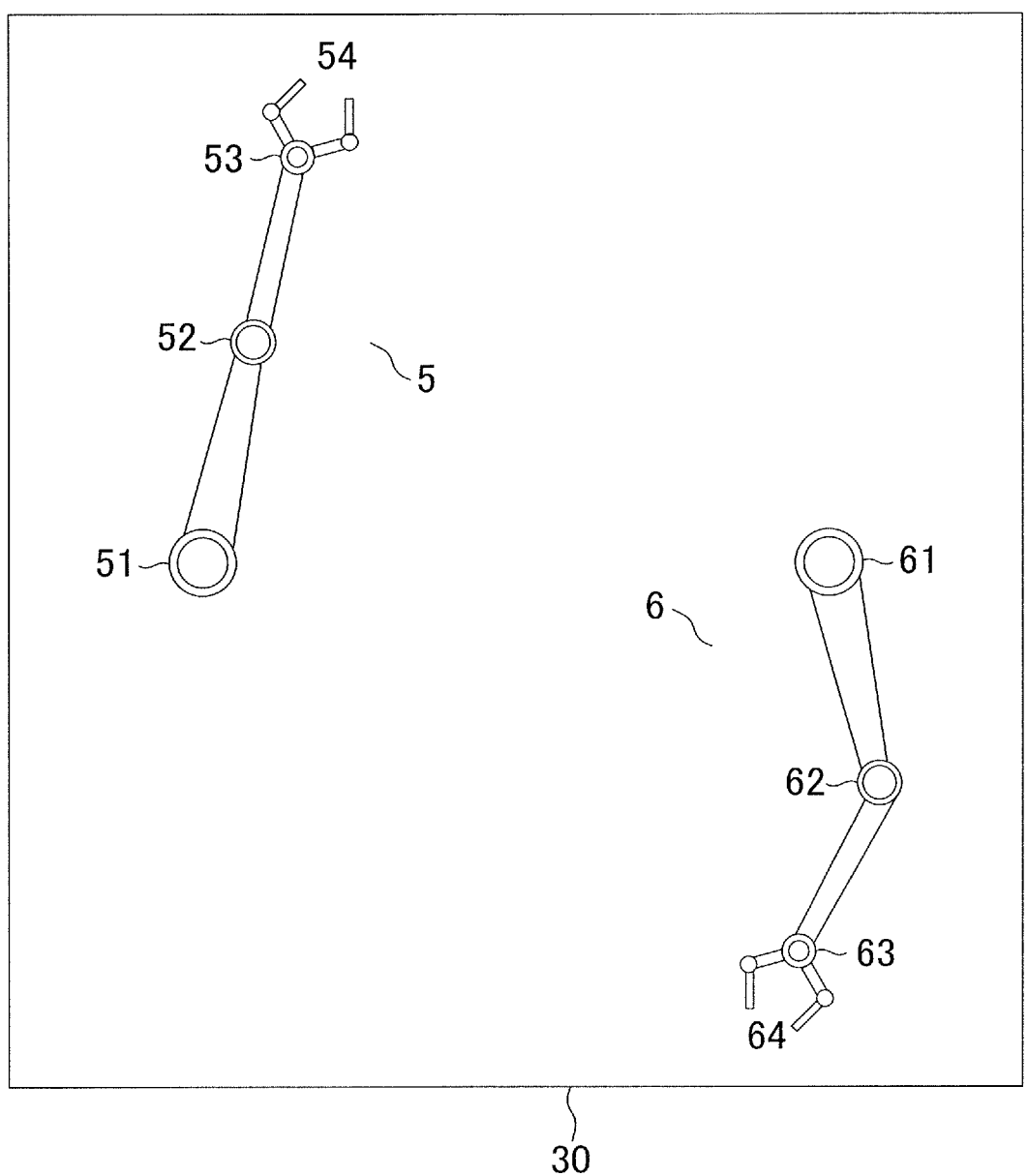
FIG. 3 illustrates exemplary robot arms to which operations are taught.

FIG. 3 illustrates the two robot arms disposed in a common working area 30 and to which operations are taught. The robot arm 5 includes three rotational joints 51, 52 and 53 and a hand 54 at a distal end of the robot arm 5. The robot arm 6 also includes three rotational joints 61, 62 and 63 and a hand 64. The rotational joint 51 of the robot arm 5 and the rotational joint 61 of the robot arm 6 are fixed respectively to a base of the working area 30. Positions of the base on which the rotational joints 51 and are fixed will be called as origins of the respective robot arms. Each robot arm moves along a sheet surface direction by driving the rotational joints.

Teaching Method

The teaching method of the first embodiment will be detailed below with reference to FIGS. 4 through 8.

Figure 4:
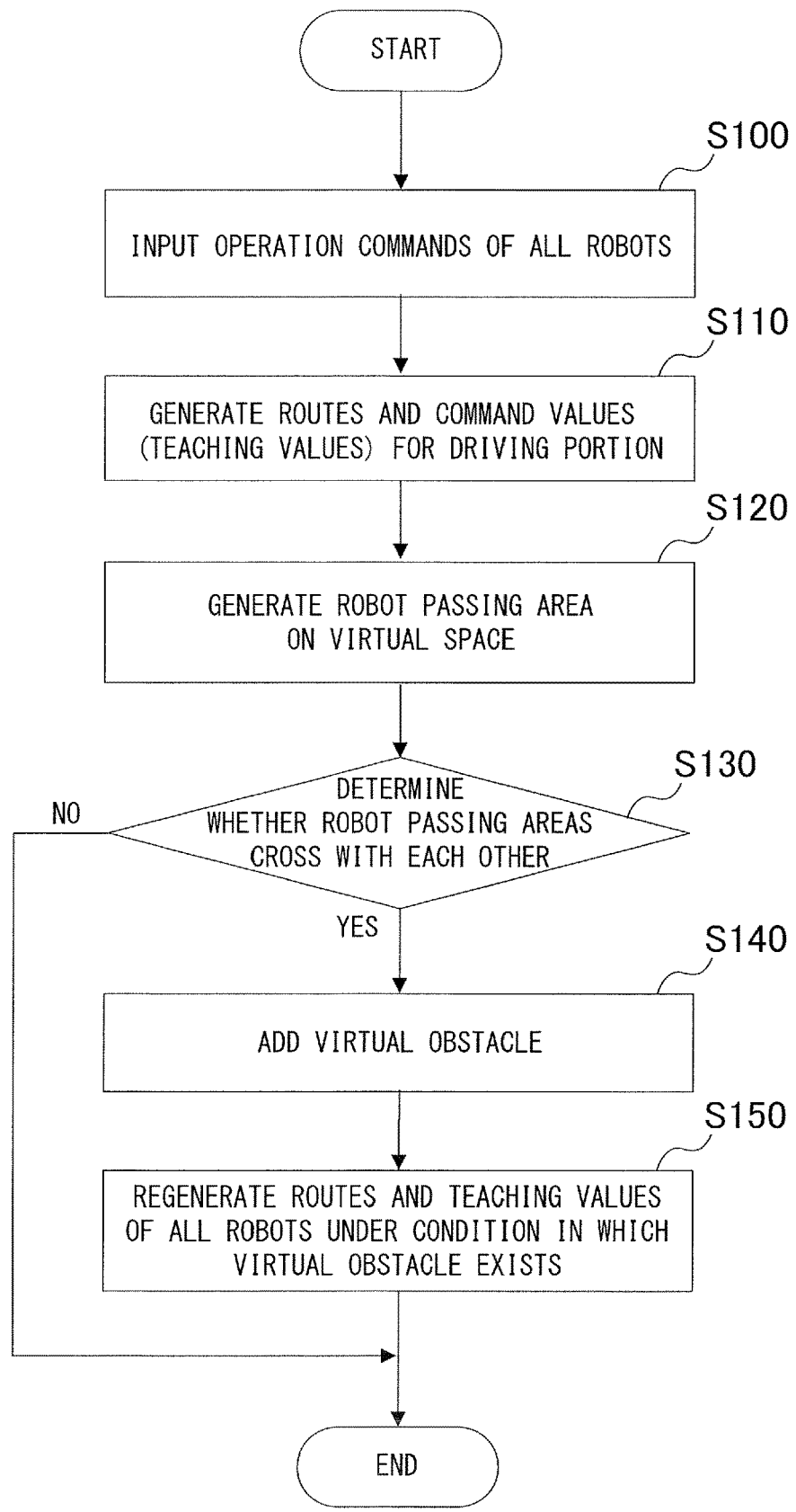
FIG. 4 is a flowchart illustrating steps of the teaching method of a first embodiment.

FIG. 4 is a flowchart illustrating processing steps of the teaching method including the following six steps. That is, the teaching method includes an operation command preparing step S100, a teaching value generating step S110 of generating teaching value for the robot to avoid an obstacle, a robot passing area calculating step S120 of generating a robot passing area on a virtual space, a crossing detecting step S130 of detecting whether the robot passing areas cross with each other, a constraint condition adding step S140 of adding a virtual obstacle as a constraint condition, and a teaching value regenerating step S150 of regenerating a teaching value for the robot to avoid an obstacle after adding the constraint condition. A program including the above-mentioned six steps is included in the ROM 21 of the arithmetic processing portion 1.

A operator inputs the operation command list, i.e., information necessary for generating the teaching value, at first in the operation command preparing step S100. The operation command list is composed of a combination of a starting point and an ending point, and a via-point as necessary. It is also possible to assign a plurality of operation commands to each robot.

The operation command list can be assigned by defining a reference point of the robot arm (e.g., the distal end of the hand in the present embodiment) and by assigning the information of the starting point, the via-point and the ending point of the reference point in the operation to be taught.

In the Step S100, information on a position and a shape of an obstacle located within the common working area 30 of the two robot arms is stored in the computer 10. Two obstacles 100 and 101 are supposed to exist within the working area 30 in the present embodiment as illustrated in FIG. 5.

Figure 5:
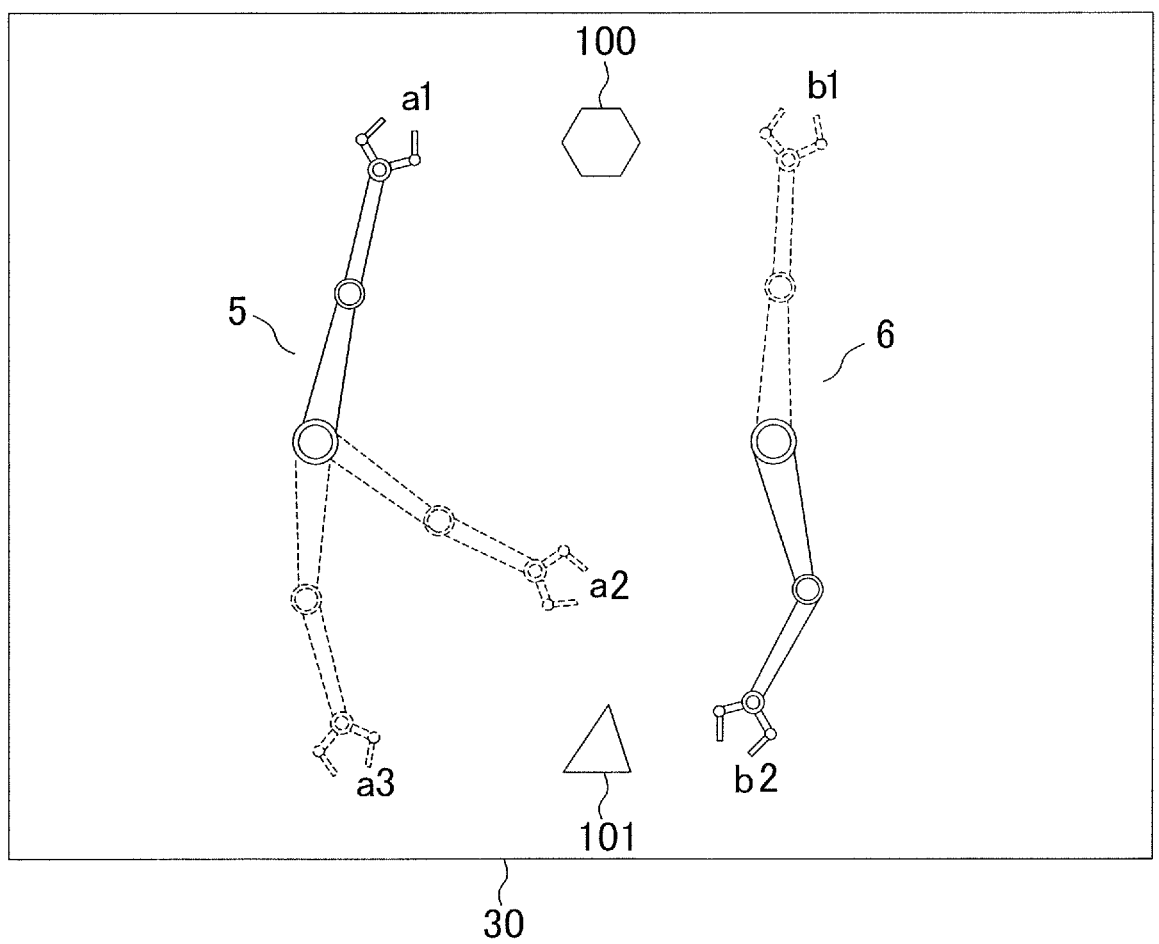
FIG. 5 illustrates exemplary starting points, via-points and end points of the robot arms and obstacles.

FIG. 5 also illustrates the starting points, the via-points and the ending points assigned to teach operations to the robot arms 5 and 6. While the reference part of the robot arm 5 is the distal end of the hand 54, a1 denotes its starting point, a2 denotes its via-point, and a3 denotes its ending point in FIG. 5. FIG. 5 may be also construed such that the robot arm 5 moves from the starting point a1 to the ending point a2 and then from the starting point a2 to the ending point a3. Still further, while a reference part of the robot arm 6 is a distal end of the hand 64, b1 denotes its starting point and b2 denotes its ending point in FIG. 5.

The following two operation commands indicated as operation commands Oa1 and Oa2, respectively, are assigned to the robot arm 5:

$$Oa1=\{a1,a2\}$$

$$Oa2=\{a2,a3\}$$

These formulas signify that the robot arm 5 moves from the starting point a1 to the ending point a2 and then from the starting point a2 to the ending point a3.

The following one operation command indicated as Ob1 is assigned to the robot arm 6:

$$Ob1=\{b1,b2\}$$

This formula signifies that the robot arm 6 moves from the starting point b1 to the ending point b2.

In the teaching value generating step S110, the computer generates a via-point (teaching value) necessary in moving the robot arm while avoiding the obstacles 100 and 101 based on the operation command. It is noted that information necessary in generating the path and the teaching value such as a link shape and a length of each robot arm and a movable range of each driving unit (joint) is stored in the computer 10 in advance.

Here, in generating the path and the teaching value of each robot arm, the computer generates them independently per each robot arm without considering an interference with another robot arm. That is, the computer generates them without recognizing the other robot arm as an obstacle.

Specifically, the teaching value generating step S110 includes three sub-steps of a path planning step, a path shortening step and a driving value calculating step.

A path for avoiding the obstacle en route from the starting point to the ending point is found in the path planning step.

It is possible to find the path by using an automatic calculating system by using various known methods such as RRT and PRM.

The path generated in the path planning step is corrected in the path shortening step. It is necessary to correct the path because the generated path may be a detour, or an angular variation may be steep in a case where a method using random search is selected in the path planning step. Although various methods of shortening the path such as those of finding points that can be connected without interference within the path and of smoothing the path more by approximating the path by a spline curve are conceivable, any method can be used here.

In the driving value calculating step, the computer calculates rotational speed and acceleration of each driving unit, i.e., each joint, of the robot arm based on the teaching value such that the robot can move the path generated by the path planning and path shortening steps described above in a shortest time and generates a command value assigned to the driving unit. The computer generates the command value without considering an interference with the other robot here.

Figure 6:
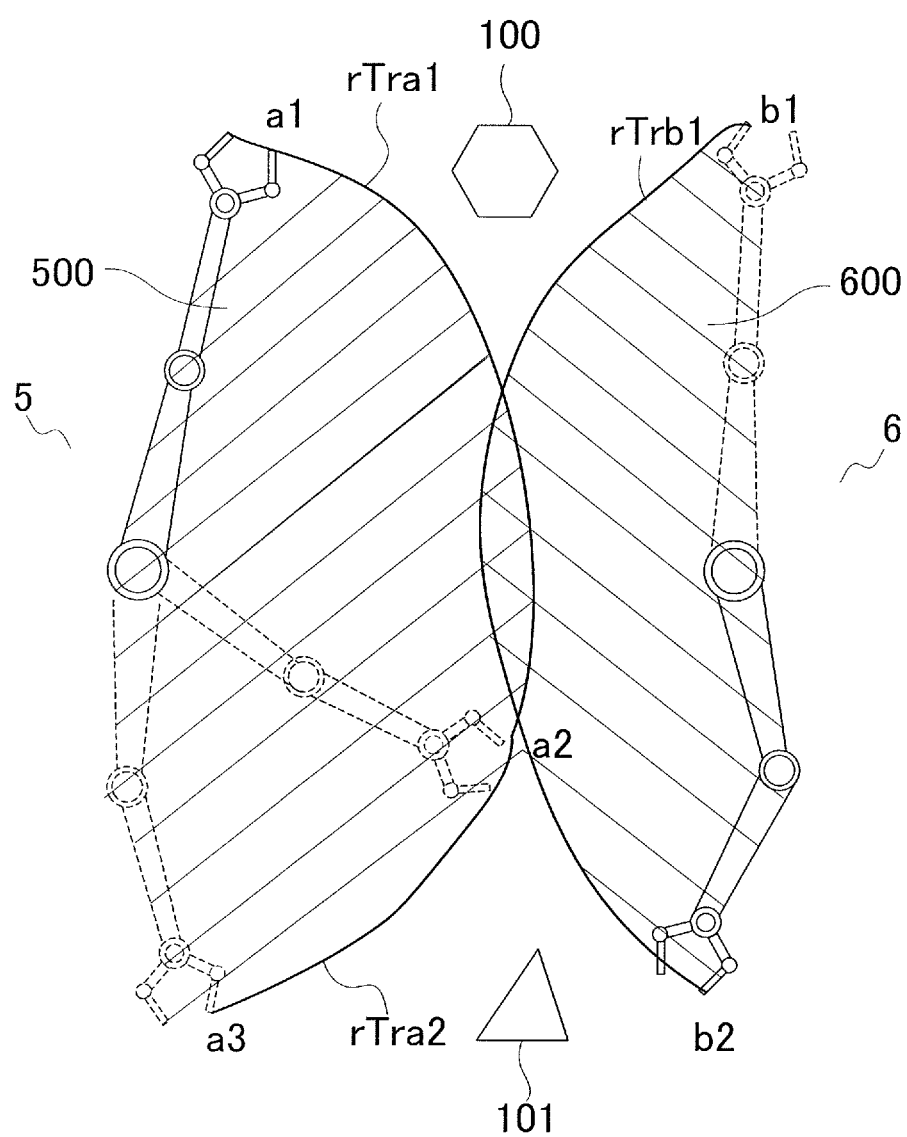
FIG. 6 is a diagram illustrating a case where robot passing areas cross with each other.

FIG. 6 schematically illustrates the paths generated based on the operation commands Oa1, Oa2 and Ob1.

As illustrated in FIG. 6, as for the robot arm 5, a path rTra1 along which the distal end of the hand, i.e., the reference part, moves is generated based on the operation command Oa1, and a path rTra2 is generated based on the operation command Oa2. Still further, as for the robot arm 6, a path rTrb1 along which the distal end of the hand, i.e., the reference part, moves is generated based on the operation command Ob1.

Next, in Step S120 in FIG. 4, the computer 10 generates a robot passing area which is a set of trajectories (swept space) on the virtual space through which each point constituting the robot passes when the driving unit of the robot is driven based on the teaching value. FIG. 6 illustrates a robot passing area 500 of the robot arm 5 and a robot passing area 600 of the robot arm 6 as areas schematically illustrated by slant lines, respectively. The computer 10 displays the obstacles and the robot passing areas of the respective robots illustrated in FIG. 6 on the display 13 to facilitate the teaching operations of the operator.

Then, in Step S130 in FIG. 4, the computer 10 finds and determines whether the robot passing area 500 of the robot arm 5 crosses (overlapped) with the robot passing area 600 of the robot arm 6 on the virtual space through calculation.

In the case illustrated in FIG. 6, there is a crossing (overlapping) part of the robot passing area 500 and the robot passing area 600, and it can be understood that the robot arms interfere with each other if the respective robot arms are driven based on the teaching values generated in the teaching value generating step S110.

In a case where no crossing (overlapping) part of the robot passing areas is detected, i.e., No in Step S130, the computer 10 adopts and stores the teaching values already generated. In the case where the computer 10 detects the crossing (overlapping) part like the case in FIG. 6 however, i.e., Yes in Step S130, the computer 10 sets a constraint condition and regenerates teaching values. The computer 10 displays the constraint condition thus set and others on the display 13 to facilitate the teaching operations of the operator.

In the first embodiment, the computer 10 generates information of a virtual obstacle through which no robot can pass as the constraint condition anew at least to a part within the area where the robot passing areas cross (overlap) with each other and adds the constraint condition in the obstacle information in Step S140. Then, the computer 10 regenerates teaching values under such condition in Step S150. The computer 10 displays the information of the virtual obstacle set as the constraint condition and others on the display 13 to facilitate the teaching operations of the operator.

More specifically, as illustrated in FIG. 6, while the robot passing area 500 crosses with the robot passing area 600 along the path rTra1 and the path rTrb1, the areas do not cross along the path rTra2 and the rTrb1.

Figure 7:
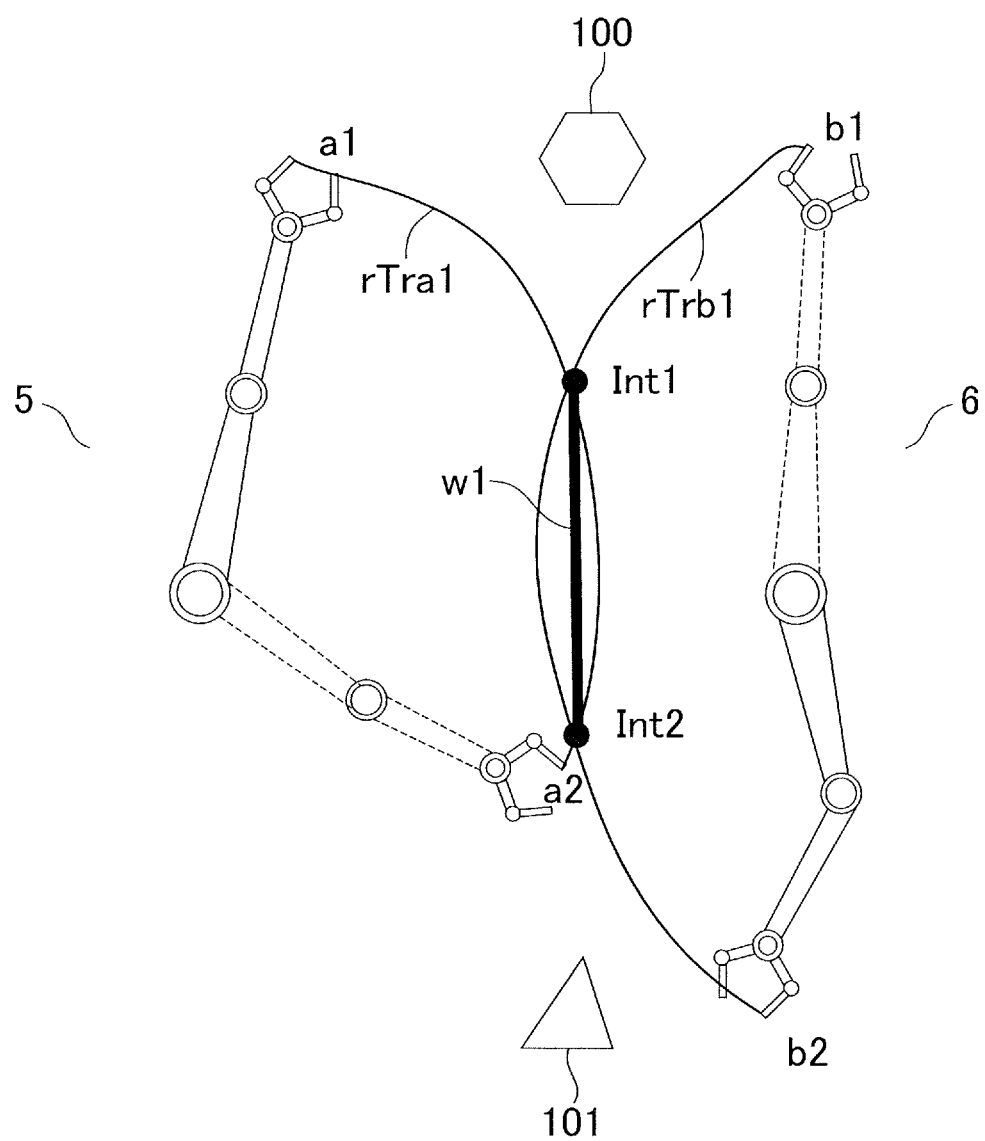
FIG. 7 illustrates an obstacle virtually added.

Then, the computer 10 performs a process for adding the virtual obstacle on the crossing paths rTra1 and the rTrb1 in Step S140. FIG. 7 illustrates this process. At first, the computer 10 calculates points Int1 and Int2 which are crossing points of the robot passing areas on the paths rTra1 and rTrb1 as illustrated in FIG. 7. Next, the computer 10 calculates a line connecting the points Int1 and Int2 and adds this line in the obstacle information as a new virtual obstacle w1. Although the virtual obstacle to be added is one in this case, a plurality of obstacles may be added if the robot passing area crosses at a plurality of places.

Figure 8:
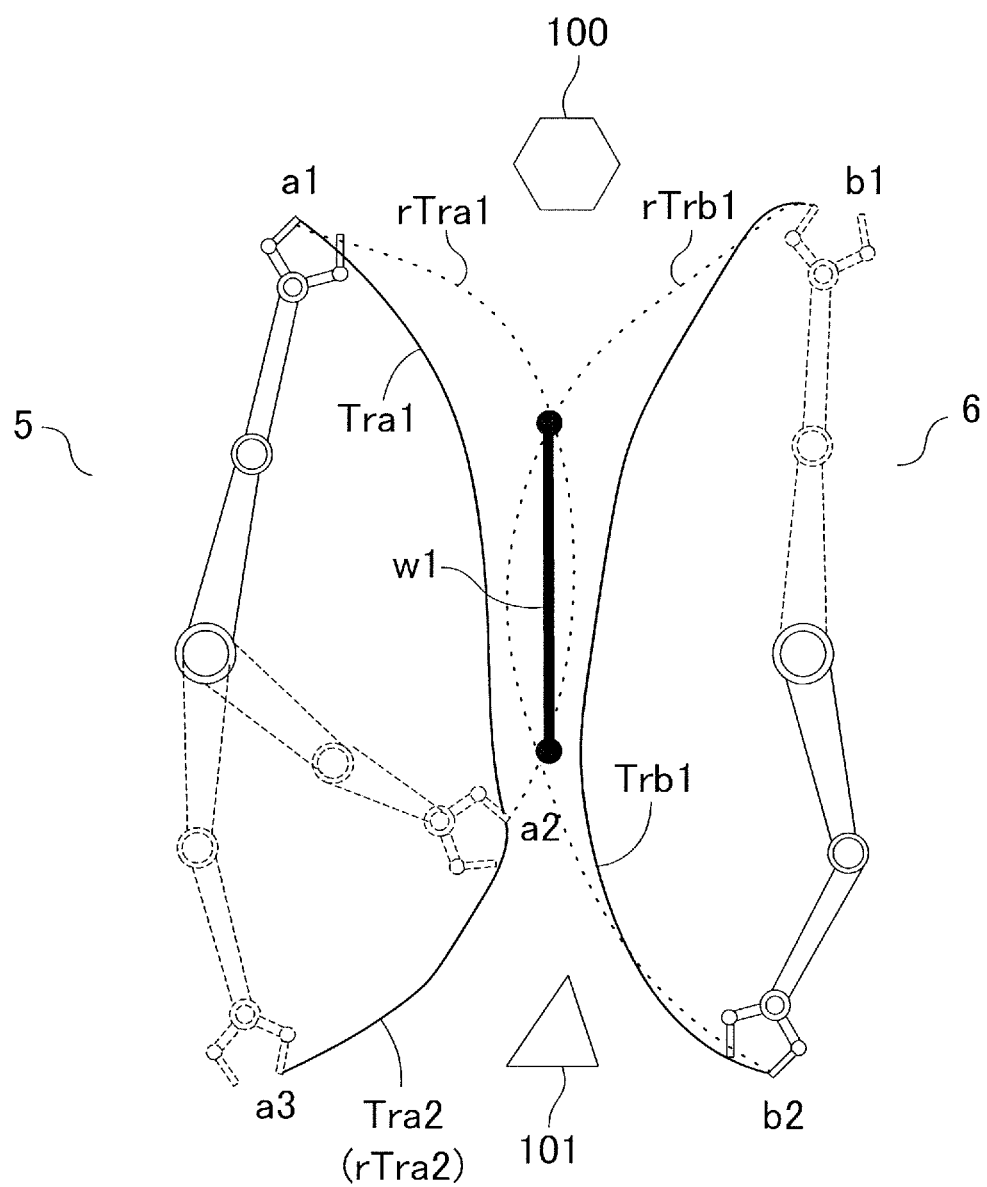
FIG. 8 is a diagram illustrating paths regenerated after virtually adding the obstacle.

Then in Step S150, the computer 10 regenerates a path so as to avoid the obstacles and the virtual obstacle added in Step S140. FIG. 8 illustrates a result in a case where the path is generated again under the condition in which the virtual obstacle w1 is added. Although the path based on the operation command Oa1 was rTra1 first, a new path Tra1 is generated as a result of the addition the obstacle w1. The path rTrb1 based on the operation command Ob1 is also generated as a new path Trb1. The path rTra2 based on the operation command Oa2 changes nothing because this path does not cross with the robot passing area of the robot arm 6 from the beginning. The computer 10 displays the obstacles illustrated in FIG. 8, the virtual obstacle, robot passing area of the respective robots based on the regenerated paths and others on the display 13 to facilitate the teaching operations of the operator.

The computer 10 stores via-points corresponding to the newly generated path as changed teaching values.

This arrangement makes it possible to obtain the paths Tra1 and Tra2 of the robot arm 5, the path Trb1 of the robot arm 6 and the teaching values corresponding to the paths. The regenerated paths and the teaching values can be said as what considers the operation of the other robot. As it is apparent from FIG. 8, it can be seen that the robot arms are prevented from interfering with each other without controlling the operation timing and coordinating speeds because the robot passing areas do not cross with each other.

It is noted that the virtual obstacle has been expressed as the line in the first embodiment because the description has been made by exemplifying the robot arms that operate planarly. However, there is a case where a virtual obstacle to be added needs to be expressed planarly or three-dimensionally for a multi-joint robot or the like that operates three-dimensionally. The computer 10 displays the obstacles, the virtual obstacle, the robot passing areas of the respective robot arms and the like on the display 13 by using three-dimensionally expressed images to facilitate the teaching operations of the operator. In such a case, it is favorable to use the technology of a swept space (Swept Volume) that enables to find an area through which an object has passed by moving through the area.

In a case where the technology of the swept space is applied, it is possible to calculate an area swept by a link of one robot along its path for one robot arm and to determine whether another robot arm interferes with that area when the other robot arm is operated along its path. It is possible to find crossing points Int1 and Int2 on a three-dimensional space similarly to the case described above by calculating two points where the path of the other robot arm starts to interfere with the swept area and where the path does not interfere with the area any longer. Next, a planar or three-dimensional virtual obstacle including the two points on the three-dimensional space is generated. For instance, a plane obtained by extending the line segment connecting two points in a height direction of the robot arm may be generated as an obstacle to be added. Or, a round column having an axis of the line segment connecting the two points may be generated as a virtual obstacle.

As described above, the teaching method of the first embodiment is also applicable to the case of the robot moving through a three-dimensional space.

Second Embodiment

The robot teaching system as illustrated in FIGS. 1 and 2 will be used to teach the two serial-link type robot arms each having the rotational joint as illustrated in FIG. 3 also in a second embodiment. An overlapped explanation with that of the first embodiment will be omitted here.

In the first embodiment, the robot passing areas are found, and in a case where a crossing part is detected, a virtual obstacle is added at least to a part of the crossing area. Then, a path is generated again to generate a path, and teaching values, which does not interfere with a robot passing area of the other robot.

Whereas, the path is corrected in the second embodiment by additionally setting not the virtual obstacle but a via-point for avoiding the robot passing areas from crossing with each other. Here, the via-point is a point through which the robot arm has to pass while moving from a starting point to an ending point, and it becomes possible to correct the path of the robot arm by disposing the via-point at an adequate position.

A teaching method of the second embodiment including a method for adding the via-point will be described below.

Figure 9:
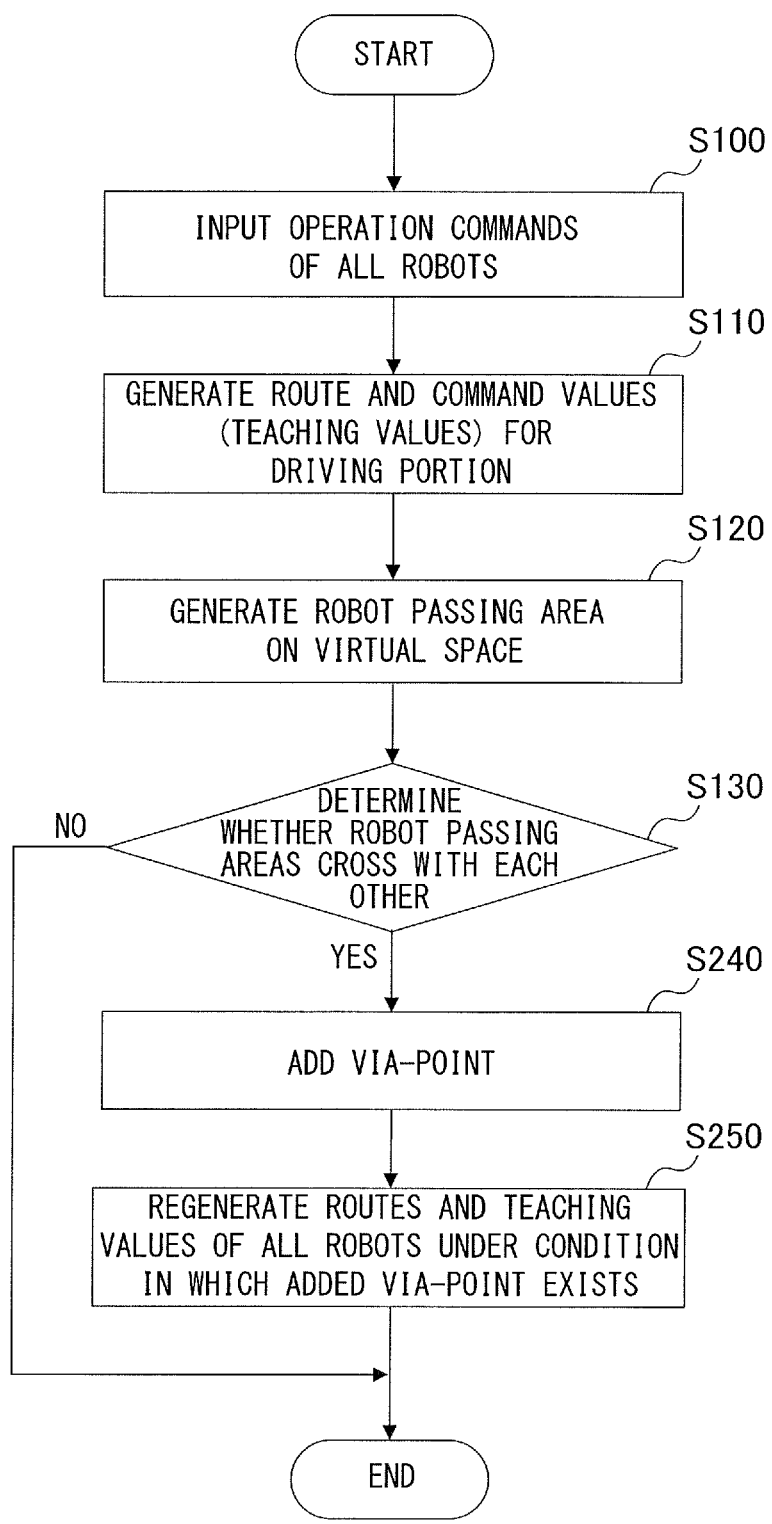
FIG. 9 is a flowchart illustrating steps of a teaching method of a second embodiment.

FIG. 9 is a flowchart illustrating steps of the teaching method of the second embodiment including the following six steps. That is, the teaching method includes an operation command preparing step S100, a teaching value generating step S110 of generating teaching value for the robot to avoid an obstacle, a robot passing area calculating step S120 of generating a robot passing area on a virtual space, a crossing detecting step S130 of detecting whether the robot passing area crosses with another robot passing area, a constraint condition adding step S240 of adding a via-point as a constraint condition, and a teaching value regenerating step S250 of regenerating a teaching value for the robot to avoid the obstacle after adding the constraint condition. A program including the abovementioned six steps is included in the ROM 21 of the arithmetic processing portion 1.

Among the steps described above, Steps S100 through S130 are same with those of the first embodiment. In the second embodiment, it is also supposed that the computer 10 generates the robot passing areas in FIG. 6 in Step S120 and detects whether the robot passing area crosses (overlaps) with the other robot passing area in Step S130 similarly to the first embodiment.

Although the computer 10 has added the virtual obstacle as the constraint condition in Step S140 in FIG. 4 after detecting the crossing part in the first embodiment, the computer 10 adds a via-point as a constraint condition in Step S240 in FIG. 9 of the second embodiment.

Figure 10:
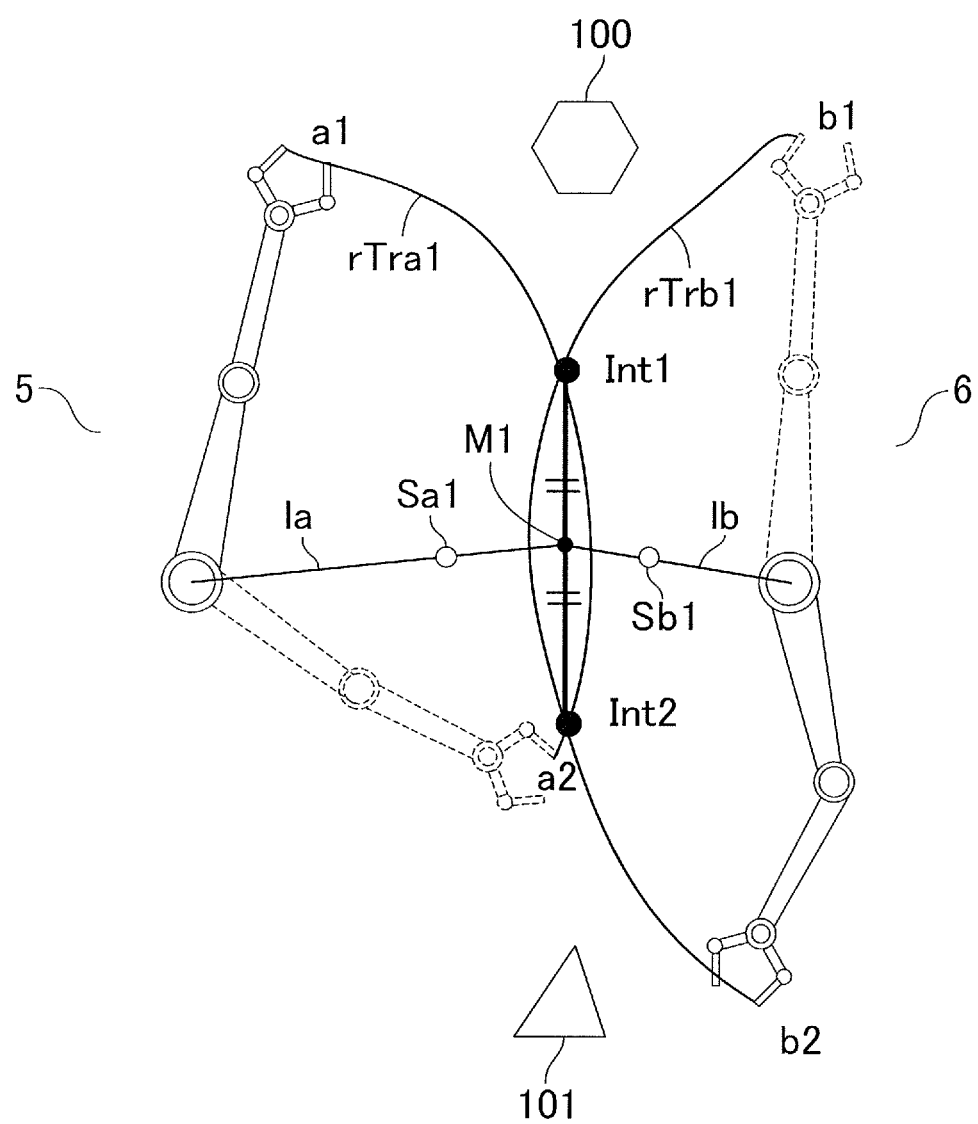
FIG. 10 is a diagram illustrating an added via-point.

At first, as illustrated in FIG. 10, the computer 10 calculates and finds an intermediate point M1 of a line segment connecting the points Int1 and Int2 from the points Int1 and Int2 where the robot passing areas of the paths rTra1 and rTrb1 cross with each other. While the intermediate point M1 is desirable to be a midpoint equally dividing the line segment as illustrated in FIG. 10, it may be another point on the line segment. Then, a line segment connecting the intermediate point M1 with the origin of the robot arm 5, i.e., a position on the base on which the rotational joint 51 is fixed, is denoted as 1a, and a line segment connecting the intermediate point M1 with the origin of the robot arm 6, i.e., a position on the base on which the rotational joint 61 is fixed, is denoted as 1b. Points on the respective line segments when the line segments 1a and 1b are divided by an arbitral ratio are denoted as Sa1 and Sb1. The computer 10 adds these points as the via-points in generating paths again. The computer 10 displays the obstacles, the points Int1 and Int2 where the robot passing areas cross with each other, the intermediate point M1, the via-points Sa1 and Sb1 and others on the display 13 to facilitate the teaching operations of the operator.

Various methods are conceivable as to how to set the ratio in dividing the line segments 1a and 1b. For instance, the ratio may be set such that a distance between Sa1 and Sb1 is longer than a clearance that is desirable to be at least assured to operate the two robot arms. The ratio may be changed by times in operating the robot arms along the paths rTra1 and rTrb1.

The constraint condition by which none of the plurality of robots can pass is set to the space where the robot passing areas cross with each other by adding the via-points. In a case where the via-point is added, the teaching value generated in the teaching value generating step S110 is changed. For the robot arm 5, the operation command Oa1 is divided and is changed into an operation command Oa1–1 from the starting point a1 to the via-point Sa1 and an operation command Oa1–2 from the via-point Sa1 to the ending point a2. Accordingly, the operation commands to the robot arm 5 are changed as follows:

$Oa1\text{-}1=\{a1,Sa1\}$, $Oa1\text{-}2=\{Sa1,a2\}$, $Oa2=\{a2,a3\}$

Similarly to that, the operation commands to the robot arm 6 are changed as follows:

$Ob1\text{-}1=\{b1,Sb1\}$, $Ob1\text{-}2=\{Sb1,b2\}$

The computer 10 regenerates the teaching values based on the operation commands changed as described above in Step S250 in FIG. 9.

Figure 11:
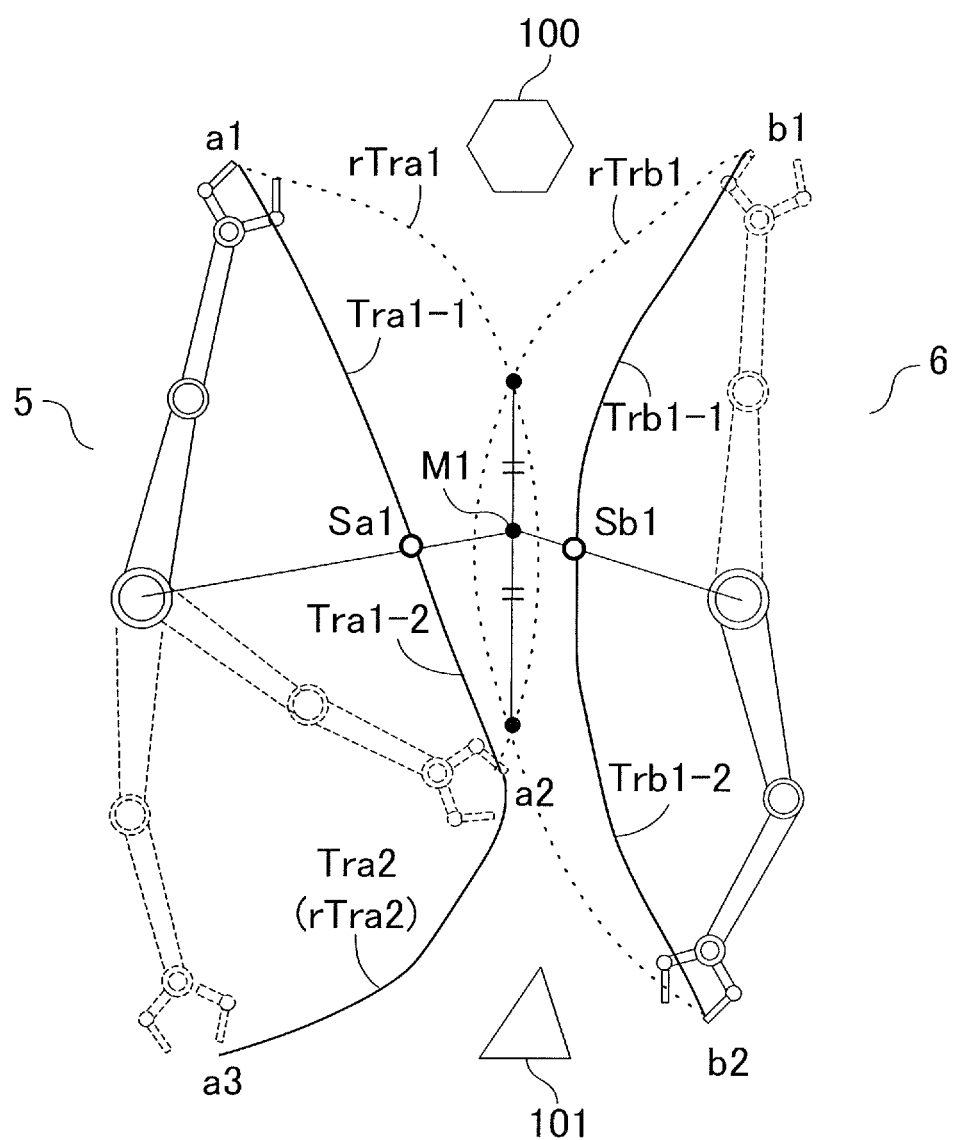
FIG. 11 is a diagram illustrating paths regenerated after adding the via-point.

FIG. 11 illustrates paths of the reference parts in moving the respective robot arms while avoiding the obstacles 100 and 101 based on the regenerated teaching values. The computer 10 generates paths Tra1–1 and Tra1–2 passing through the via-point Sa1 with respect to the original path rTra1. And the computer 10 generates paths Trb1–1 and Trb1–2 passing through the via-point Sb1 with respect to the original path rTrb1. Thus, the paths of the respective robot arms and the teaching values corresponding to the paths are obtained. The computer 10 displays the obstacles, the via-points illustrated in FIG. 11, and the robot passing areas and other of the respective robot arms based on the regenerated paths on the display 13 to facilitate the teaching operations of the operator.

It is thus possible to generate the paths by which the respective robot arms do not interfere with each other by the method of adding new via-points like the second embodiment. The method of adding the via-points is characterized in that it is readily possible to intentionally correct the paths because the positions where the via-points are added can be arbitrarily decided. It means that it becomes possible to coordinate such that one robot is operated in a short operating time and another robot is operated in a long operating time for example.

It is noted that while the second embodiment has been described by exemplifying the robot arms that operate planarly, this arrangement is applicable also to robots moving in a three-dimensional space.

Third Embodiment

While the first embodiment has been described by exemplifying the two robot arms that operate planarly, there is a case where the method illustrated in the flowchart in FIG. 4 is not enough in a case where the robots are operated three-dimensionally or in a case where a large number of robots share a working area. Even if the paths are regenerated by adding the virtual obstacle in Step S140, there may be a case where robot passing areas cross with each other even by the regenerated paths.

Figure 12:
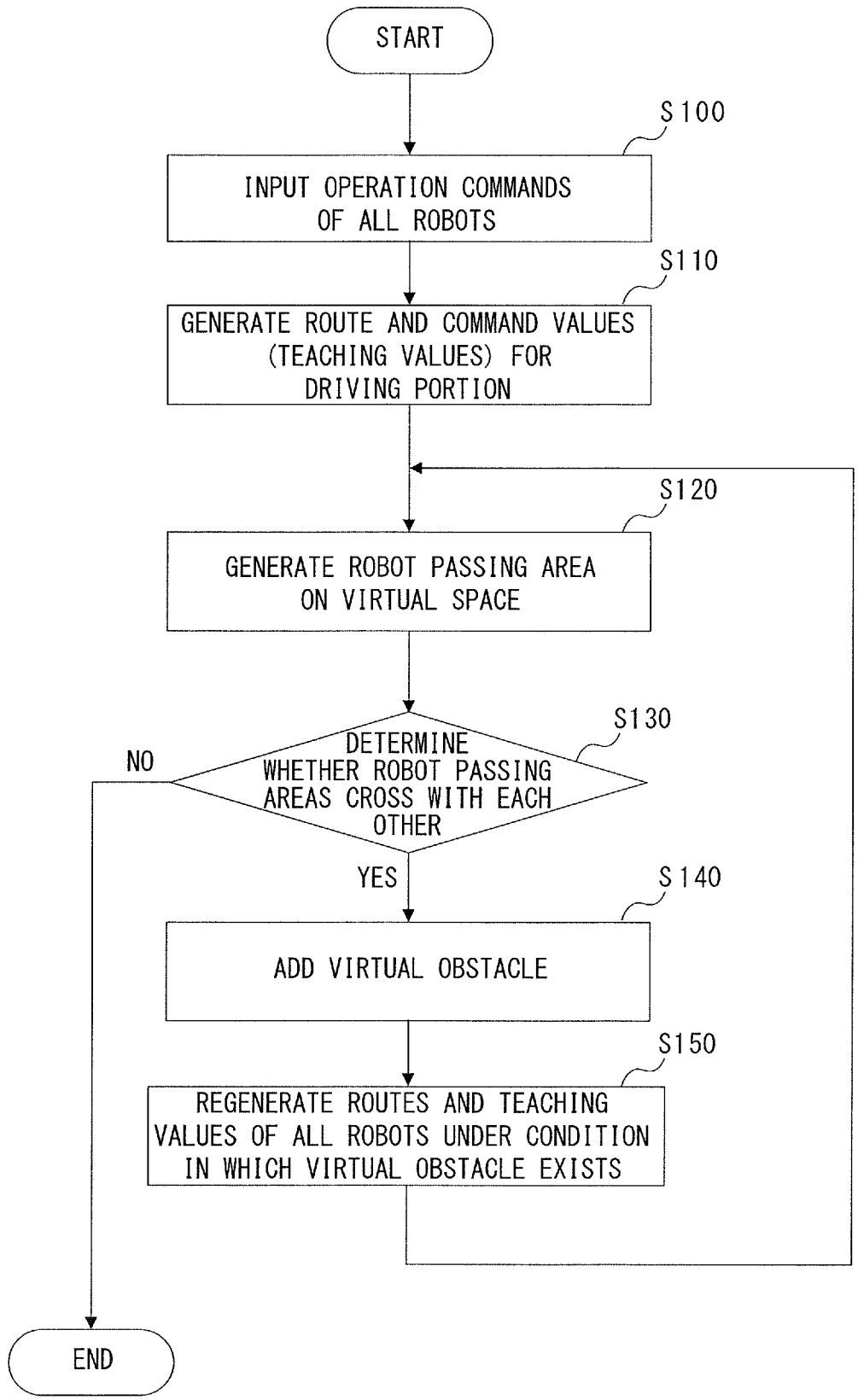
FIG. 12 is a flowchart illustrating steps of a teaching method of a third embodiment.

Then, a processing flow changed as illustrated in FIG. 12 is used in a third embodiment. That is, the processing flow is not finished as it is after generating the paths and the teaching values under the condition in which the virtual obstacle is added in Step S150. The process is returned to Step S120 to generate robot passing areas based on the regenerated teaching values, and it is determined if the robot passing areas cross with each other in Step S130. It is possible to generate paths and teaching values that cause no crossing reliably by thus forming a feedback loop and by repeatedly executing the addition of constraint condition and the regeneration of teaching values until when no crossing is detected. The computer 10 displays the obstacles, the virtual obstacles, the robot passing areas and other on the display 13 in each step of the processing flow in FIG. 12 to facilitate the teaching operations of the operator.

Fourth Embodiment

While the second embodiment has been described by exemplifying the two robot arms that operate planarly, there is a case where the method illustrated in the flowchart in FIG. 9 is not enough in a case where the robots are operated three-dimensionally or in a case where a large number of robots share a working area. Even if the paths are regenerated by adding the via-points in Step S240, there may be a case where robot passing areas cross with each other even by the regenerated paths.

Figure 13:
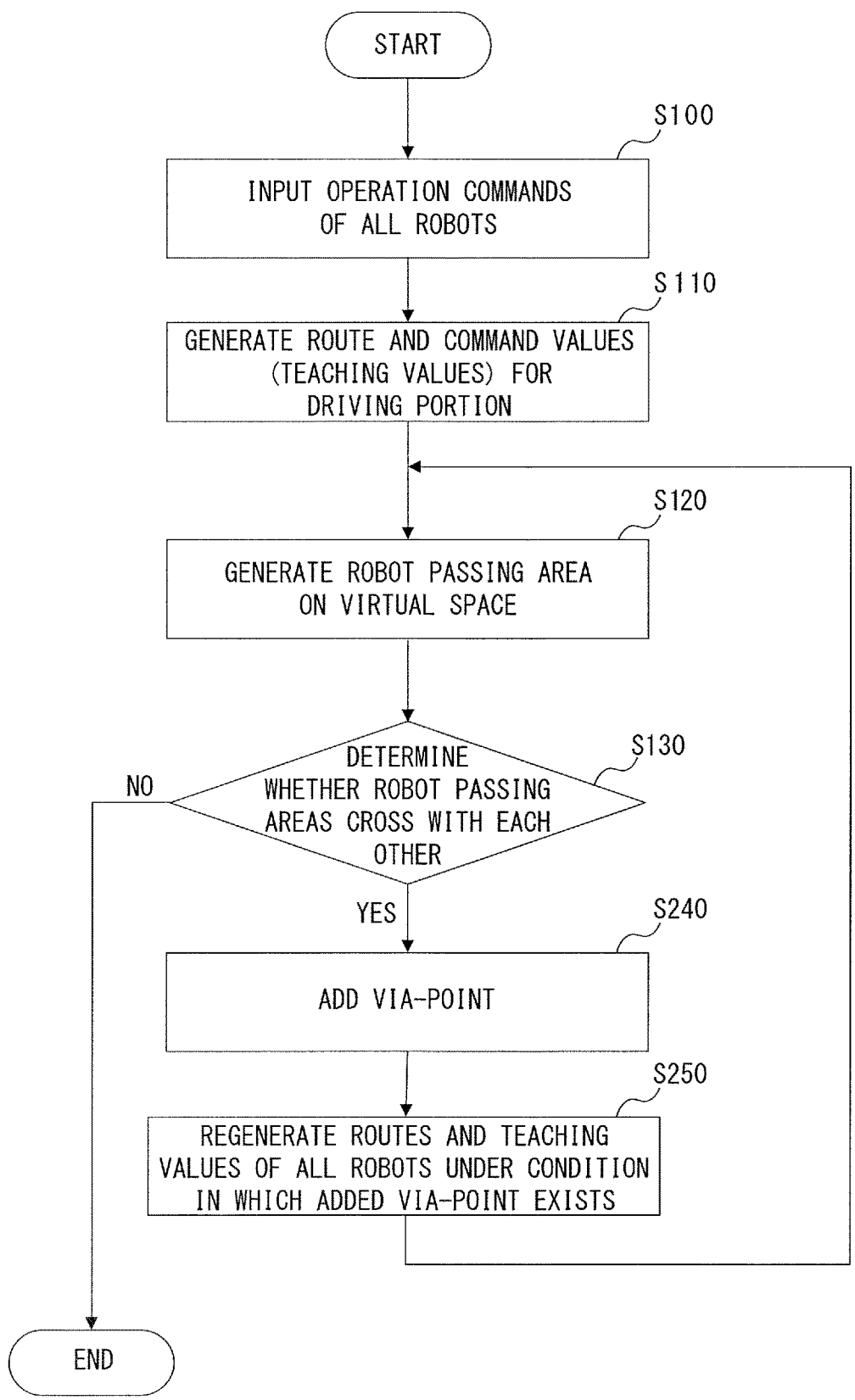
FIG. 13 is a flowchart illustrating steps of a teaching method of a fourth embodiment.

Then, a processing flow changed as illustrated in FIG. 13 is used in the fourth embodiment. That is, the processing flow is not finished as it is after generating the paths and the teaching values under the condition in which the via-points are added in Step S250. The process is returned to Step S120 to generate robot passing areas based on the regenerated teaching values, and it is determined if the robot passing areas cross with each other in Step S130. It is possible to generate paths and teaching values that cause no crossing reliably by thus forming a feedback loop and by repeatedly executing the addition of constraint condition and the regeneration of teaching values until when no crossing is detected. The computer 10 displays the obstacles, the via-point, the robot passing areas and other on the display 13 in each step of the processing flow in FIG. 13 to facilitate the teaching operations of the operator.

Embodiments of the present disclosure are not limited to the four embodiments described above and may be adequately modified or combined. For instance, a shape of the common working area, a number, types and installation positions of the installed robots are not limited to the case described above. The configuration of the computer generating the teaching values is not also limited to the case described above.

The present disclosure can be also realized by a process in which a program configured to realize one or more functions of the abovementioned embodiments is supplied to a system or a unit through a network or a storage medium and in which one or more processors in that system or the unit read and execute the program. The present disclosure can be realized also by a circuit, e.g., ASIC, that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-041508, filed Mar. 6, 2017, and Japanese Patent Application No. 2018-016810, filed Feb. 1, 2018, which are hereby incorporated by reference wherein in their entirety.

What is claimed is:

1. A teaching method for teaching an operation to a first robot and a second robot disposed so as to have a common working area, wherein the operation is taught through a computer, the method comprising:

obtaining by the computer a first path for the first robot through which a first reference part of the first robot moves from a first point to a second point via the first path while avoiding an obstacle and a second path for the second robot through which a second reference part of the second robot moves from a third point to a fourth point via the second path while avoiding the obstacle, based on an operation command list and information on a position and a shape of the obstacle, wherein the operation command list comprises positional information of the first point, the second point, the third point, and the fourth point;

obtaining by the computer a first robot passing area for the first robot and a second robot passing area for the second robot, the first robot passing area being an area where a set of trajectories drawn by points constituting the first robot when the first robot is operated such that the first reference part moves via the first path on a virtual space, the second robot passing area being an area where a set of trajectories drawn by points constituting the second robot when the second robot is operated such that the second reference part moves via the second path on the virtual space;

detecting by the computer an interference area where the first robot passing area and the second robot passing area cross with each other;

setting by the computer a constraint condition by which none of the first and second robots can pass through at least a partial space within the interference area in a case where the interference area is detected; and obtaining by the computer a first teaching value and a second teaching value, the first teaching value for moving the first reference part from the first point to the second point while avoiding the obstacle, the second teaching value for moving the second reference part from the third point to the fourth point while avoiding the obstacle, based on the operation command list, the positional information of the obstacle, and the constraint condition for each of the first and second robots.

2. The teaching method according to claim 1, further comprising:

obtaining by the computer a third robot passing area for the first robot and a fourth robot passing area for the second robot, the third robot passing area being an area where a set of trajectories drawn by points constituting the first robot when the first robot is operated based on the first teaching value on a virtual space, the fourth robot passing area being an area where a set of trajectories drawn by points constituting the second robot when the second robot is operated based on the second teaching value on a virtual space; and detecting by the computer a second interference area where the third robot passing area and the fourth passing area cross with each other.

3. The teaching method according to claim 1, wherein the step of setting the constraint condition comprises a step by the computer of setting a virtual obstacle within the interference area and a step by the computer of adding information on a position and a shape of the virtual obstacle to the information on the position and the shape of the obstacle.

4. The teaching method according to claim 1, wherein the step of setting the constraint condition comprises a step by the computer of setting a line segment connecting two points within the interference area, and a step by the computer of adding information on the line segment to the operation command list.

5. The teaching method according to claim 1, wherein the first reference part is a first hand of the first robot, and the second reference part is a second hand of the second robot.

6. A controlling method of first and second robots, comprising:

obtaining the first teaching value and the second teaching value by the teaching method as set forth in claim 1; and controlling the first and second robots based on the first teaching value and the second teaching value, respectively.

7. A non-transitory computer readable medium which stores a program causing the computer to execute the teaching method as set forth in claim 1.

8. A teaching system, comprising:

a computer; and a non-transitory computer readable medium which stores a program causing the computer to execute the teaching method as set forth in claim 1.

9. A method for manufacturing a product by using a robot system, the method comprising:

obtaining a first teaching value and a second teaching value by executing the teaching method as set forth in claim 1; and manufacturing the product by operating the robot system based on the first teaching value and the second teaching value.

10. A teaching system comprising:

a computer configured to obtain trajectories of a first robot and a second robot disposed so as to have a common working area on a virtual space, wherein the computer is configured to obtain a first path for the first robot through which a first reference part of the first robot moves from a first point to a second point via the first path while avoiding an obstacle and a second path for the second robot through which a second reference part of the second robot moves from a third point to a fourth point via the second path while avoiding the obstacle, based on an operation command list and information on a position and a shape of the obstacle, wherein the operation command list comprises positional information of the first point, the second point the third point, and the fourth point, to obtain a first robot passing area for the first robot and a second robot passing area for the second robot, the first robot passing area being an area where a set of trajectories drawn by points constituting the first robot when the first robot is operated such that the first reference part moves via the first path on a virtual space, the second robot passing area being an area where a set of trajectories drawn by points constituting the second robot when the second robot is operated such that the second reference part moves via the second path on the virtual space, to detect an interference area where the first robot passing area and the second robot passing area cross with each other, to set a constraint condition by which none of the first and second robots can pass through at least a partial space within the interference area in a case where the computer detects the interference area, and to obtain a first teaching value and a second teaching value, the first teaching value for moving the first reference part from the first point to the second point while avoiding the obstacle, the second teaching value for moving the second reference part from the third point to the fourth point while avoiding the obstacle, based on the operation command list, the positional information of the obstacle, and the constraint condition for each of the first and second robots.

11. The teaching system according to claim 10, further comprising a display unit,
 wherein the computer sets a virtual obstacle as the constraint condition within the interference area and displays the virtual obstacle on the display unit.

12. The teaching system according to claim 11, wherein the computer sets the virtual obstacle on a line segment connecting two points within the interference area.

13. The teaching system according to claim 11, wherein the computer displays the robot passing areas together with the virtual obstacle on the display unit.

14. The teaching system according to claim 10, further comprising a display unit,
 wherein the computer displays the first robot passing area, the second robot passing area, the first path, and the second path on the display unit.

15. A robot system, comprising:
 first robot
 a second robot;
 the teaching system as set forth in claim 10; and
 a controller configured to control the first and second robots;
 wherein the controller is configured to obtain a first teaching value and a second teaching value by the teaching system, and the controller controls the first and second robots based on the first teaching value and the second teaching value, respectively.

* * * * *